Oct. 26, 1971 G. N. PENSO 3,614,993
AUTOMATIC SCAFFOLDING ERECTING AND DISMANTLING MACHINE
Filed Oct. 30, 1969 8 Sheets-Sheet 1
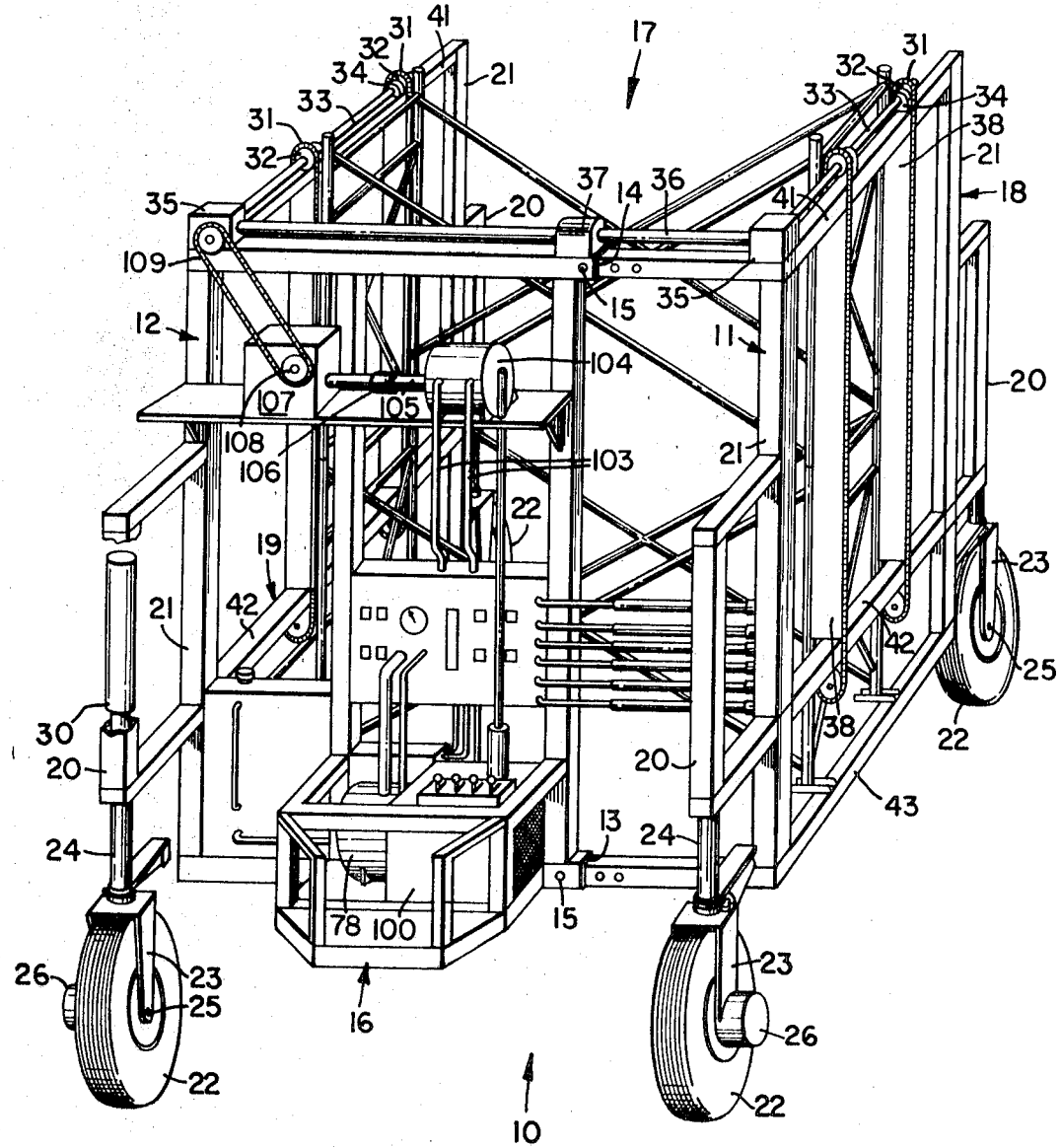
FIG_1
*INVENTOR.*
GEORGE N. PENSO
BY
ATTORNEYS Oct. 26, 1971  G. N. PENSO  3,614,993
AUTOMATIC SCAFFOLDING ERECTING AND DISMANTLING MACHINE
Filed Oct. 30, 1969  8 Sheets-Sheet 2
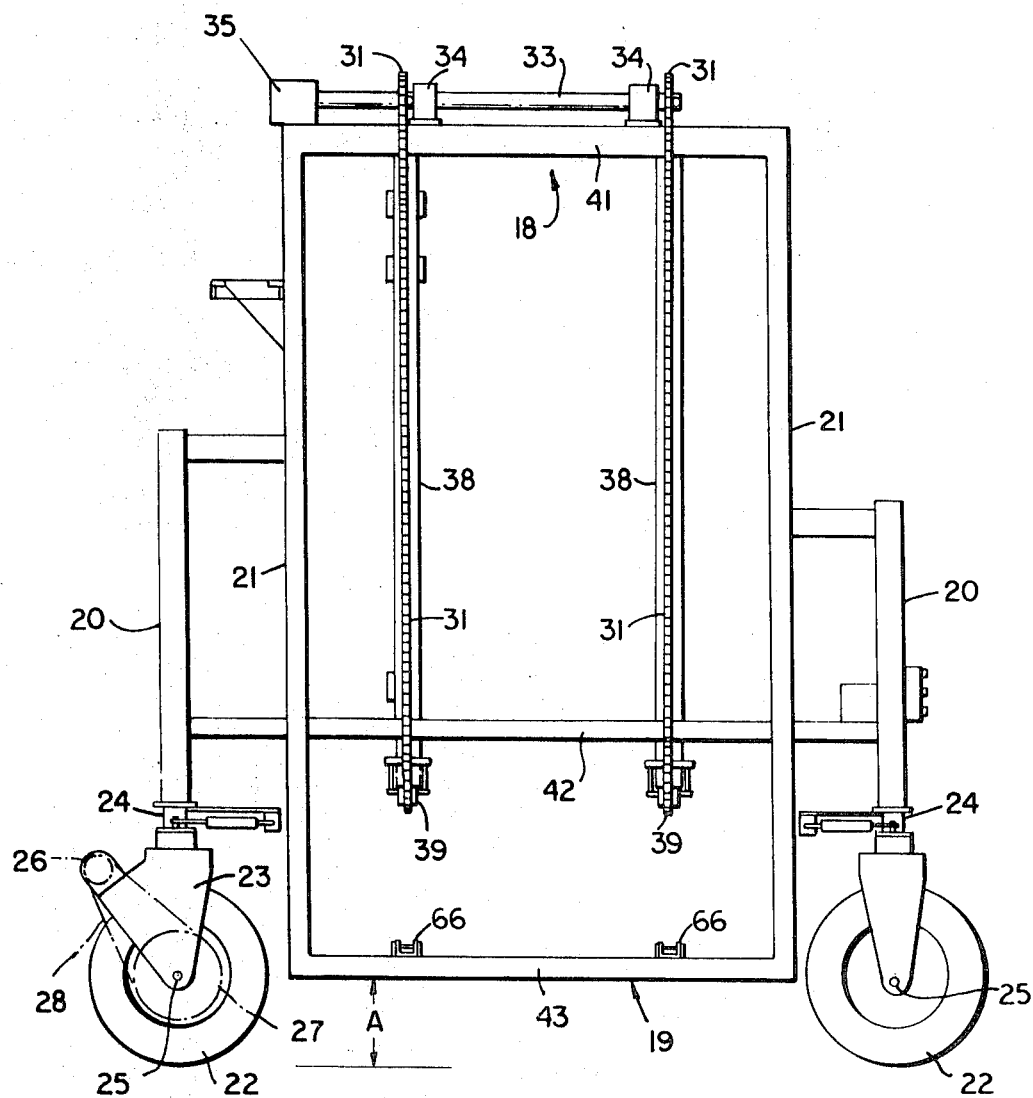
FIG_2
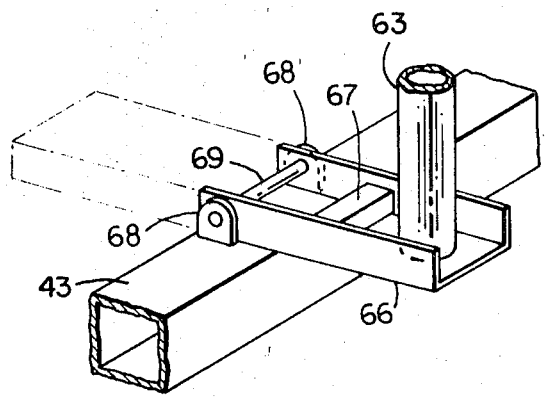
FIG_5
INVENTOR.
GEORGE N. PENSO
BY
ATTORNEYS

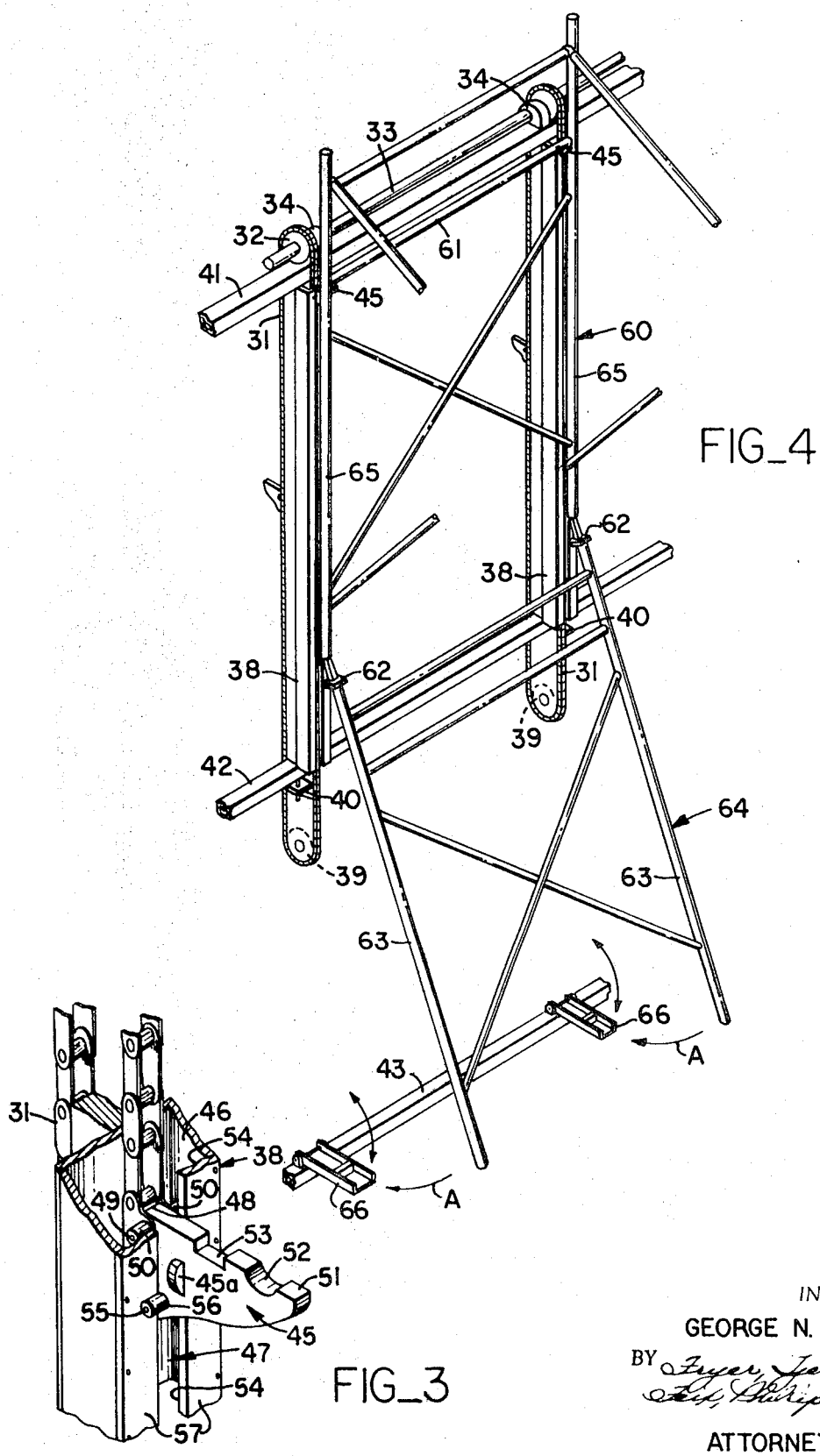

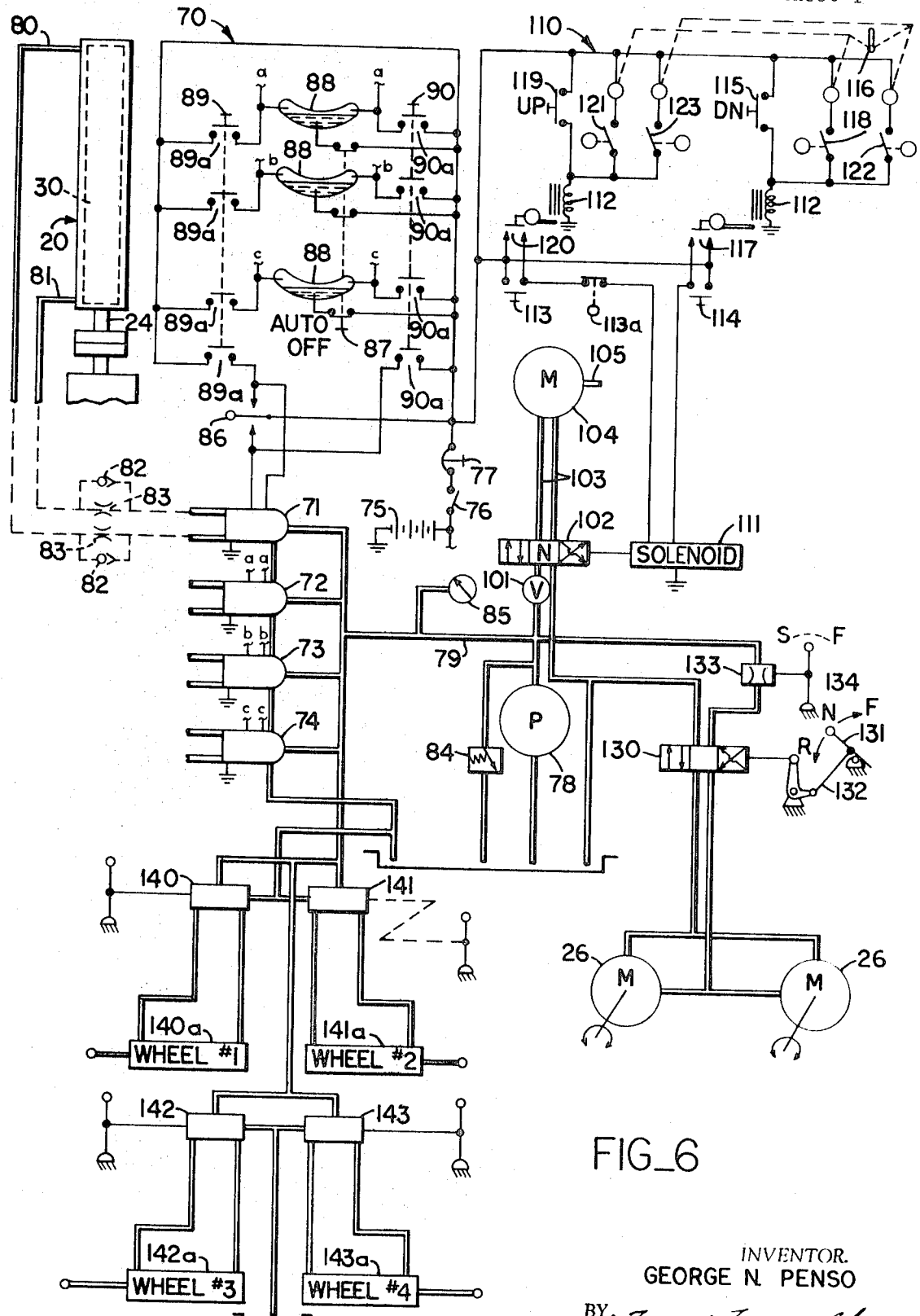
FIG_6

Oct. 26, 1971 G. N. PENSO 3,614,993
AUTOMATIC SCAFFOLDING ERECTING AND DISMANTLING MACHINE
Filed Oct. 30, 1969 8 Sheets-Sheet 5
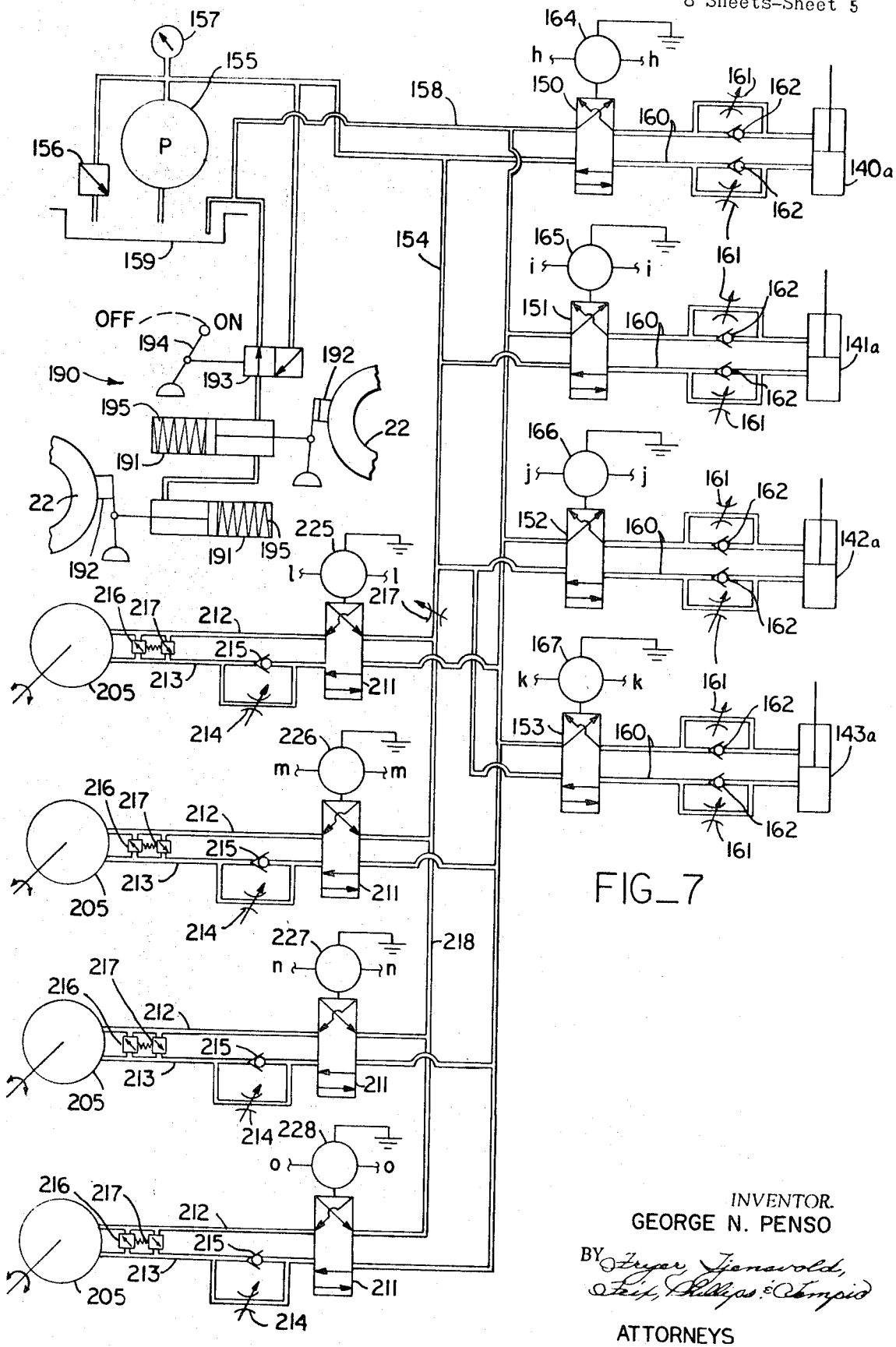
FIG_7
INVENTOR.
GEORGE N. PENSO
BY
ATTORNEYS Oct. 26, 1971   G. N. PENSO   3,614,993
AUTOMATIC SCAFFOLDING ERECTING AND DISMANTLING MACHINE
Filed Oct. 30, 1969   8 Sheets-Sheet 6
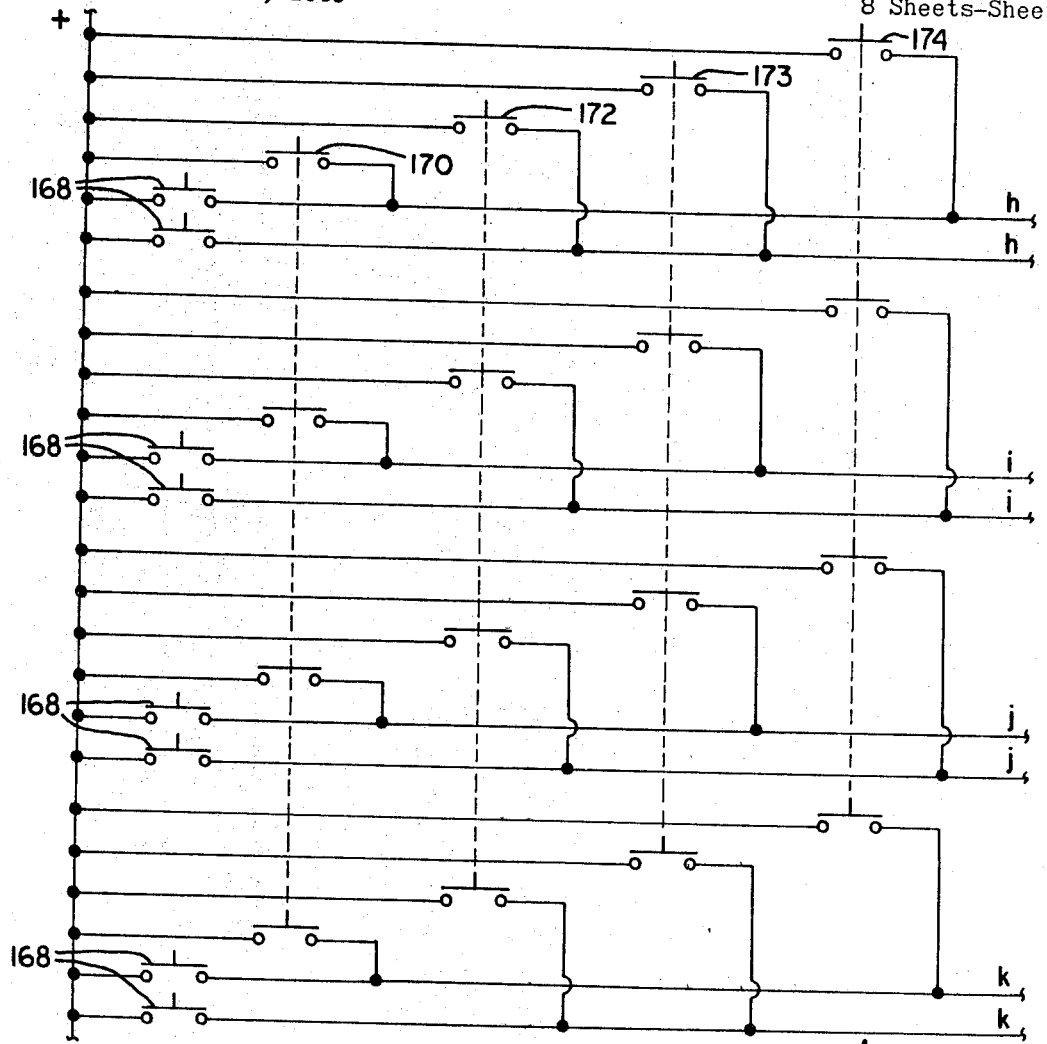
FIG_8
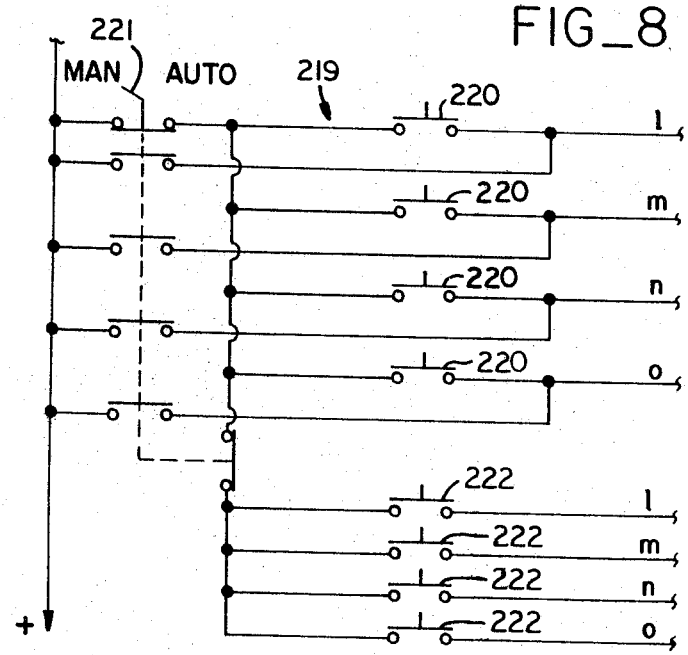
FIG_13
*INVENTOR.*
GEORGE N. PENSO
BY
ATTORNEYS

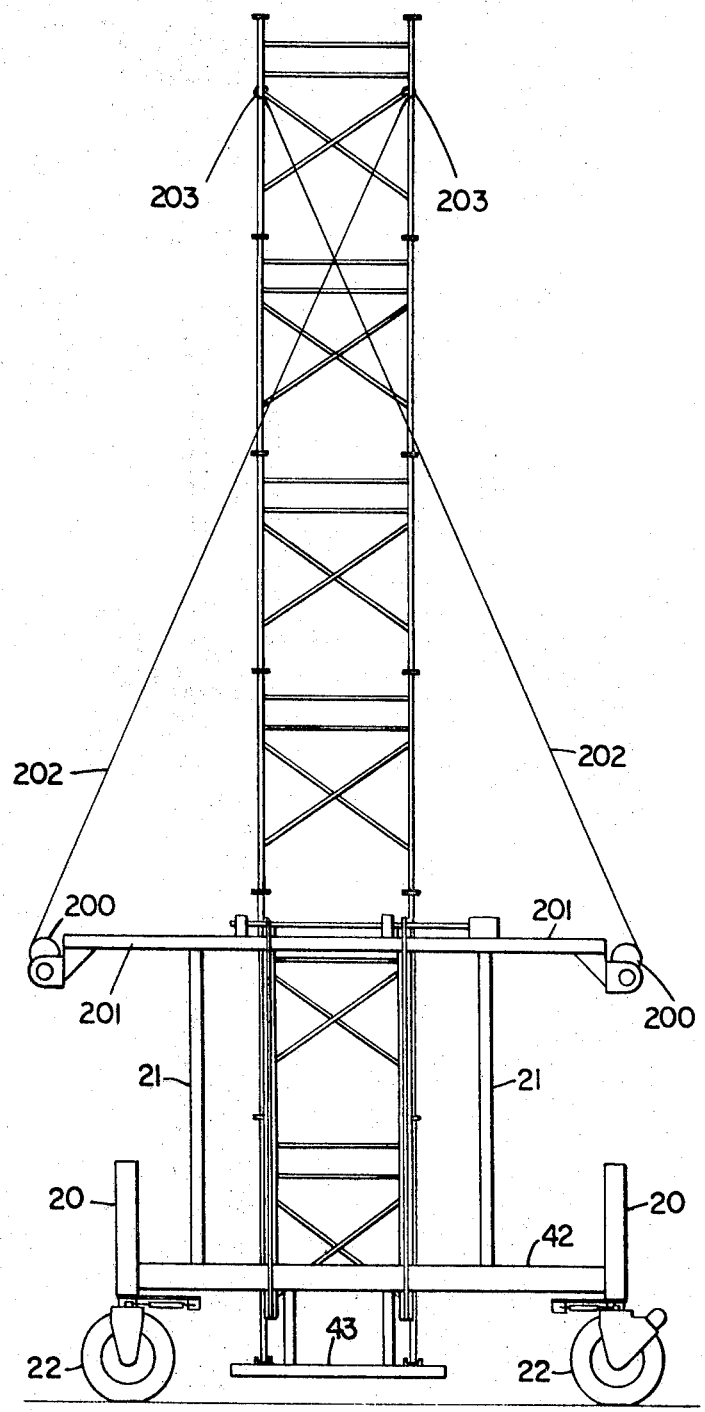
FIG_11
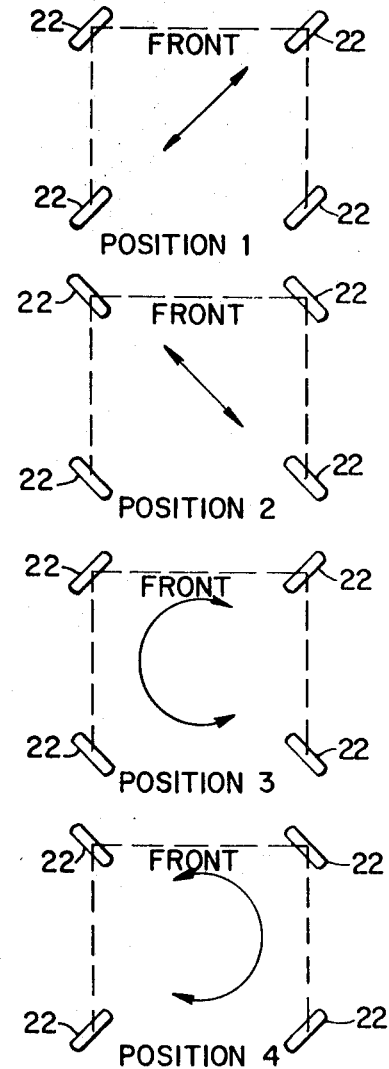
FIG_9
INVENTOR.
GEORGE N. PENSO
ATTORNEYS

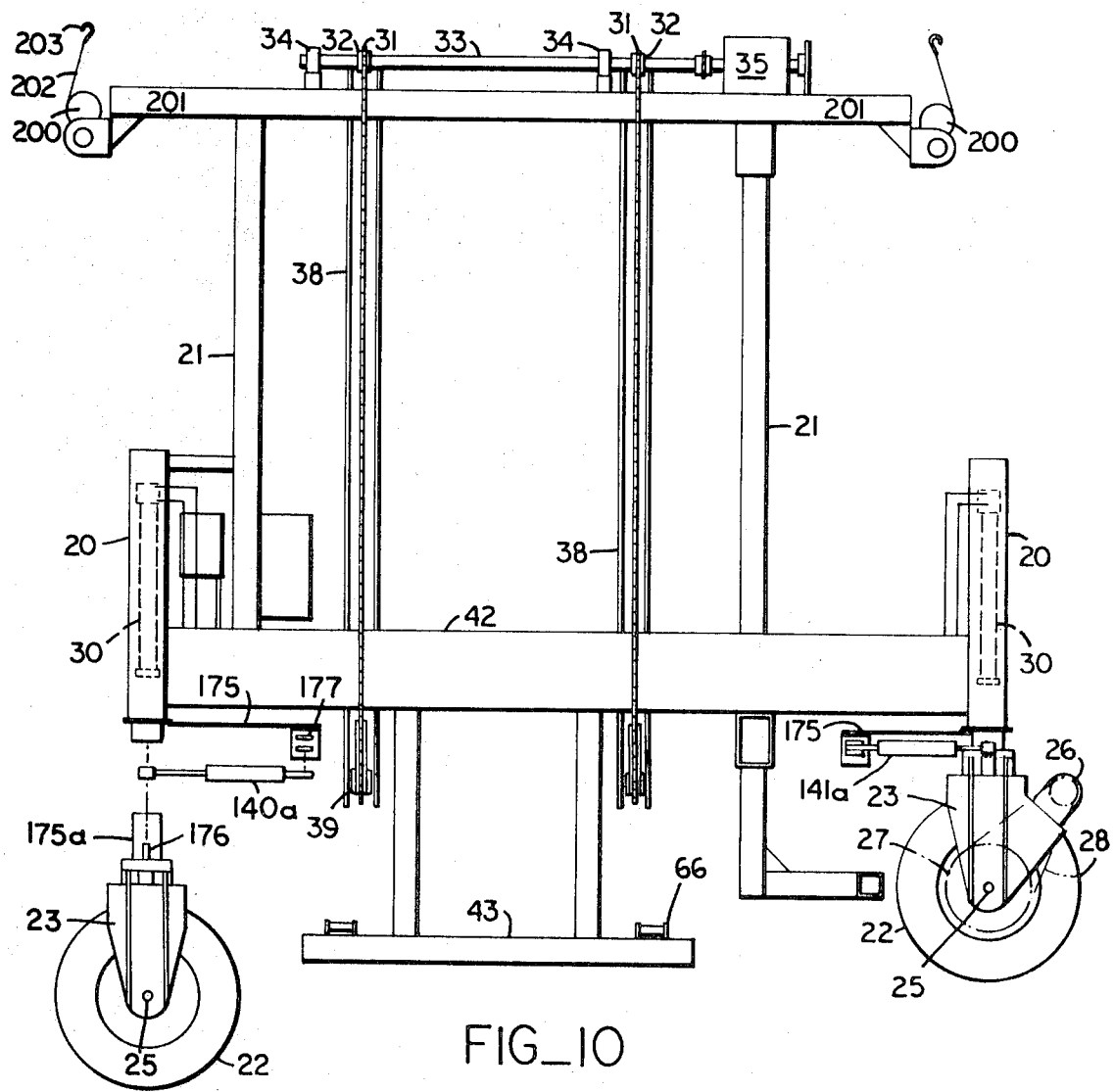
FIG_10
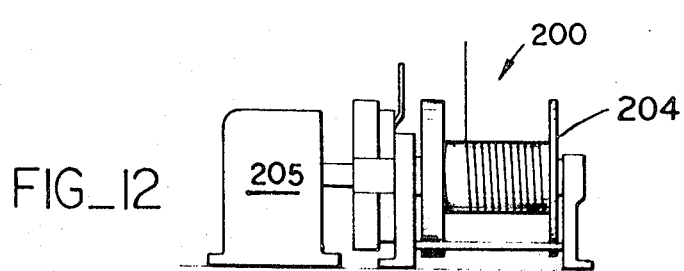
FIG_12

United States Patent Office 3,614,993
Patented Oct. 26, 1971

3,614,993
AUTOMATIC SCAFFOLDING ERECTING AND
DISMANTLING MACHINE
George N. Penso, 6637 Gatto Ave.,
El Cerrito, Calif. 94530
Filed Oct. 30, 1969, Ser. No. 872,503
Int. Cl. B65g 57/00; E04g 1/14
U.S. Cl. 182—16
16 Claims

ABSTRACT OF THE DISCLOSURE

A machine for erecting and dismantling stacks of commercial scaffolding or shoring units includes an adjustable open-sided U-frame supported on four dirigible wheels which are vertically adjustable so the frame can automatically level itself and a semi-automatic elevator system with mechanically interlocked lifting hooks which will automatically raise or lower a stack of scaffolding units by an interval of one scaffolding unit whereby a scaffolding unit may be added or subtracted from the bottom of the stack. Stabilizing winches allow the stacks to be erected during windy conditions and to greater heights.

BACKGROUND OF THE INVENTION

In construction projects, commercial scaffolding or shoring units are often employed for a variety of uses, such as supporting working platforms, concrete forms, etc. Normally, commercial scaffolding units are manufactured to standard sizes and multiple units of the same size can be assembled in vertical stacks or columns by adding units to the stack and interconnecting them with telescoping dowel pins at the corners to connect the contiguous units until a prescribed height is reached.

For shipping and handling economies, commercial scaffolding units are transported in a dis-assembled or knock-down condition. After reaching the job site, these knocked-down units are subsequently assembled into the stacks or columns. Each scaffolding unit normally consists of a pair of rectangular end frames constructed with vertical tubular members forming its corner posts and a pair of centrally hinged X-bracing members which are employed to diagonally connect the corner posts of a pair of end frames on opposite sides to form a sturdy, box-like scaffolding or shoring unit. Thus, to assemble a unit, two end frames are positioned vertically in a spaced apart relationship and a hinged X-bracing member is assembled on each side to form a box-like unit. Subsequently, a second unit is assembled on top of the first unit after telescoping dowel pins are placed in the top of each corner post of the assembled unit so they connect the units by telescoping into the bottom of the corner posts of the subsequently assembled unit thereby joining the two units together in a manner suitable for compression loading.

Often at the job site the erection or dismantling of the stacks of such scaffolding units is accomplished manually and it can be appreciated that the required lifting and effort increases in proportion to the height of the stack or column. Since the individual units are approximately six feet in height, it is conventional practice to manually assemble three units and then lift the "three-unit-stacks" with a crane to the top of the stack or column until a desired height is reached. Though this procedure is costly and hazardous, it is more convenient than building the stack unit-by-unit at the top of the stack as its height increases as is necessary where a crane is not available.

Subsequent to assembling the units into a stack or column of the selected height, additional parts of the scaffolding structure, such as junior beams, jack units and related parts, are lifted to the top of the column. These assemblies are employed to interconnect and level the tops of the individual columns to form a suitable elevated platform or support structure for the intended use of the scaffolding. Lifting of these relatively heavy assemblies to the top of the individual columns requires the services of a crane or the manual pulling of these assemblies to the top of the stacks or columns with ropes. In either case, it is a difficult and costly final step in assembling scaffolding structures.

To improve the effectiveness of personnel assembling commercial scaffolding units and to reduce the effort required, attempts have been made to build machines to aid in the erection and dismantling of such commercial scaffolding units. One such machine is illustrated in U.S. Pat. 2,794,558 issued to Miles and a similar device is shown in U.S. Pat. 1,360,131 issued to Miller. These machines allow scaffolding units to be added or subtracted from the bottom of a stack or column by supporting the stack with the machine.

While the machines disclosed in the above patents will eliminate some of the manual lifting effort required in assembling stacks of scaffolding units by allowing the scaffolding units to be added or subtratced from the bottom of the stack or column, they have not achieved wide commercial acceptance. Such machines require highly skilled operators and often require the utilization of special support equipment in order to employ them. Further, the stacks or columns tend to be unstable within such machines, limiting the height of the stacks or columns assembled therein.

Therefore, it is an object of this invention to provide an automated machine which can be operated by unskilled personnel for assembling commercial scaffolding.

Also, it is an object to provide a scaffolding machine which will raise and lower the stack or column of scaffolding units in a stable, plumb relationship.

It is also an object of the current invention to provide a fully steerable machine for improved maneuvering in close quarters and for moving short columns or stacks without dis-assembling them.

Another object of the instant invention is to provide a scaffolding machine which is self-leveling so that the plumb of the stack or column is maintained as the units are added or subtracted from the stack or column.

Another object of the machine is the provision of an adjustable frame whereby different sizes and types of the several standard sizes of scaffolding units may be employed with the machine.

Still another object of the machine is to provide an automatic elevating system which has its lift hooks mechanically interlocked in a timed relationship so that columns or stacks assembled therein will be raised or lowered in a plumb, vertical manner when the frame of the machine is level.

Still a further object of the invention is the employment of a guide stabilized elevating system to stabilize the bottom stack or column and prevent swaying of the stack or column within the machine.

Another object is the provision of winches with uniformly tensioned cables connected to the top of the stack or column as it rises or lowers, thereby stabilizing its top from oscillations induced by wind or other loadings.

It is also an object of the instant invention to provide an automated machine which will allow two assemblers to rapidly erect or dismantle stacks or columns of scaffolding units through a push-button control.

Other objects and advantages of the invention will be apparent from the description thereof which follows.

SUMMARY OF THE INVENTION

An automatic scaffolding erecting and dismantling machine includes a box-like frame formed of two L-shaped members telescoped together to form said frame with one open side, an open top and an open bottom so said frame can partially surround scaffolding units; four dirigible wheels connected to support said frame at its corners above the ground; a plurality of vertically adjustable means connected to said frame whereby the height of said frame above the ground can be adjusted; a vertical elevator system having at least a pair of inwardly directed spaced apart lifting hooks mounted on opposite sides of said frame, said lifting hooks mechanically timed with one another; drive means connected to power said elevator system; and control circuits connected to said dirigible wheels, said vertical adjustable means and said vertical elevator system for operating these components.

The frame can be adjusted in width for different size scaffolding units and the control circuits normally include automatic level control means and automatic elevator control means whereby the frame can be automatically leveled through the vertically adjustable means and the elevator will automatically lift or lower a machine supported scaffolding unit a prescribed vertical interval when activated. Also, a winch system with a plurality of winches mounted from the corners of the machine with their cables connected to the top of a stack of scaffolding units egressing from the machine enhance the stability of the stack allowing the vertical transport of upper scaffolding parts with the top scaffolding unit by applying equal and uniform tension on all of the cables.

DESCRIPTIONS OF THE DRAWINGS

The invention will be better understood by reference to the following specification in conjunction with the attached drawings wherein:

FIG. 1 is a corner perspective of the novel scaffolding machine with two scaffolding units assembled therein and parts broken away to show detail;

FIG. 2 is an elevation of a side frame of the machine;

FIG. 3 is a broken away perspective of a hook and guide assembly, one of four employed in the machine elevator system;

FIG. 4 illustrates how an end frame is assembled in the machine through a broken away perspective of one of the side frames of the machine;

FIG. 5 is a perspective of one of the four channel foot supports;

FIG. 6 is a schematic illustration of the electrical and hydraulic control circuits of the machine for the drive of elevating system, the control of automatic leveling system, the vehicle drive system and the machine wheel steering system;

FIG. 7 is a schematic showing an alternate hydraulic system for steering, a positive action brake system and the hydraulic circuits for the winch drive system;

FIG. 8 is an electrical schematic for the alternate button steering system;

FIG. 9 is a series of wheel positions which are obtained through the use of the steering circuits shown in FIG. 8;

FIG. 10 is an elevation of an alternate frame construction with one wheel exploded to show the detail of its wheel steering;

FIG. 11 illustrates how the winch system is employed to stabilize the stack of scaffolding units egressing from the top of the machine;

FIG. 12 is an elevation of the winch and its hydraulic drive motor; and

FIG. 13 is an electrical schematic of the winch control system.

DESCRIPTION OF THE PREFERRED EMBODIMENT

Show in perspective in FIG. 1, the scaffolding machine 10 includes two L-shaped frame members 11 and 12 which are telescoped together in joints 13 and 14 to form a U-shaped box-like main frame for the machine that has one open side. Pins 15 located adjacent each telescoping joint lock the L-shaped frame members together after the machine has been adjusted to the proper width to accept the scaffolding units which will be assembled or dismantled with the machine. By making the width of the machine adjustable, it can accommodate several types and sizes of scaffolding units thereby increasing its flexibility.

For convenience the side of the U-shaped frame opposite the open side of the box-like main frame will be designated as the front 16 and the open side as the back 17 of the machine. The two side frames 18 and 19 are joined perpendicularly to the front frame and move toward or away from one another as the front frame is adjusted by telescoping the L-shaped frame members in joints 13 and 14 as the width of the machine is adjusted.

Extending in a parallel alignment from each end of each side frame 18 and 19 are outrigger wheel frames 20. These wheel frames are of a rectangular box beam construction and are connected to the vertaical corner post 21 of the box-like main frame structure so that a dirigible wheel 22 supported by a fork 23 connected to a vertically adjustable wheel post 24 can be reciprocally mounted in each outrigger wheel frame in a manner so there will be adequate clearance between the main frame and the wheel to allow the main frame to be lowered below the level of axles 25 of wheels to achieve the desired frame-to-ground clearance and to accommodate leveling of the frame prior to the assembly or dismantling of stacks or columns of scaffolding units in it. The wheels can be made of hard rubber to increase machine stability.

Normally two of the four dirigible wheels 22 will be powered to drive the vehicle, and generally the wheels located at the front of the machine will be powered by electric or hydraulic motors 26 for driving the vehicle. The hydraulic motors illustrated in FIG. 1 are connected to directly drive the associated wheel through its axle 25, while in the alternate embodiment for the drive system shown in FIG. 2, the motors power their associated wheel through a bull gear 27 and chain 28 which connects the bull gear to a sprocket driven by its motor. Hydraulic motors are desirable for drive motors since they provide infinitely variable speed control within their speed range and will hydraulically lock the wheels against rotation when their control valve is closed. In hydraulic locking the wheels, they will function as brakes for the machine. Of course, braking can be obtained through the reduction gearing in electric drive motors. However, the wheel lock feature is not as positive as in the case of hydraulic motors.

As indicated above, each vertical wheel post 24 is reciprocally mounted in its associated wheel frame 20 and will normally include an associated hydraulic jack 30 (see FIG. 1) which vertically reciprocates the wheel post relative to its wheel frame 20. As a result of this arrangement, the box-like main frame can be leveled by independent adjustment of these four jacks, one being associated with each wheel post. Since the machine will often be employed on sloping and uneven surfaces, it is important that the main frame be adjusted to level so that the stacks or columns assembled in the machine will rise in a plumb condition. While jacks 30 provide the actuating means by which the frame can be leveled, the instant machine includes automatic controls whereby the machine will self-level. As a result, a level condition of the main frame can be obtained quickly and accurately and maintained without the necessity of a highly skilled operator employing rather lengthy and time-consuming leveling procedures. The automatic system and circuitry referred to will be described with reference to FIG. 6.

As an alternate to employing the reciprocal wheel posts 24 to adjust the machine to a level condition, jacks similar to jacks 30 can be employed in each of the four corner posts 21 so they can be extended and retracted in a vertical manner. If the extending portion of such jacks includes a ground-engaging pad, these jacks can be employed in the same manner as hydraulic jacks 30 to level the main frame of the machine by lifting the dirigible wheels free of the ground. In this latter embodiment, the jacks pads directly engage the ground.

The elevator system employed in the machine is identical on both side frames 18 and 19 and each side of the elevator consists of a pair of spaced apart elevator chains 31 which are driven by sprockets 32 keyed to a common lay shaft 33. The lay shaft is journaled in spaced apart pillow block bearings 34 on the top of its associated side frame. Angle drive transmissions 35 are secured to the top of each front corner post 21 and connect the lay shafts on each side frame and connects them through a cross shaft 36 having a central pillow block bearing 37 supporting it. The cross shaft consists of two pieces, an outer tubular drive member with a female spline and a telescoping male spline drive member which slides axially into the tubular member or out of the tubular member when the L-shaped frame members are adjusted through joints 13 and 14 for various widths of scaffolding units.

Utilizing the above-described arrangement, the pairs of elevator chains 31 on the side frames 18 and 19 are mechanically interlocked or timed with one another so that the elevator system will always be synchronized. Therefore, scaffolding units which are supported by the elevator system on the two side frames will always rise or descend in a level or plumb condition if the main frame of the machine is level.

Each elevator chain 31 tracks inside a vertical channel guide 38 (see FIGS. 2 and 3) to an idler sprocket 39 located at the bottom of its associated guide which includes a chain tightening assembly 40 for its associated elevator chain. The elevator chains extend upwardly on the outboard side of their associated guide member from their idler sprockets to their drive sprocket 31 thereby forming endless chain loops. Two of these vertical guides are mounted vertically in a spaced relationship in each of the side frames between its top beam 41 and an intermediate cross beam 42, as can be seen in FIGS. 2 and 4.

Construction of the vertical guides 38 is best illustrated in FIG. 3 where a guide is shown in perspective with parts broken away and also with an elevator hook 45 connected to its associated elevator chain 31. Each guide is of a box channel construction having a central channel 46 and a slot 47 through which the heel 48 of the hook extends to its attachment with its elevator chain 31. Each hook is triangular in shape and has the top of its heel connected to its elevator chain (illustrated as a roller chain) with a pin 49 that couples the heel with the elevator chain attaching plates and projects on both sides of the hook and its chain connection. Mounted on these projecting end portions of this pin are rollers 50 which prevent the chain and heel of the hook from being pulled through the slot when loads are acting downwardly on its tip 51 when carrying the scaffolding units supported in positioning apertures 52 and 53. The inside surfaces 54 of each guide on opposite sides of the slot are smooth so that rollers 50 can track on these surfaces as the elevator chain moves up and down. Adjacent the bottom of the heel of each hook, another pin 55 is employed to support rollers 56 on its ends projecting outwardly on opposite sides of its hook. This latter pin is vertically offset so that its rollers will track on the outside surfaces 57 of the guide when hook is level.

As a result of the arrangement of rollers 50 and 56 track on the inner and outer surfaces of the guide 38 respectively when the hooks are supporting stacks of scaffolding units and will not tip or pivot, that would change their timed relationship. Thus, the elevator chains will remain substantially vertically within each guide and the base of the stack is stabilized laterally. Because the toe of each hook engages the end frame of the scaffolding unit, any downward travel of hooks would normally interfere with this frame structure below the lift points. However, since the instant hook structure is connected to the chain in a single point pivoted arrangement by pin 49 and the rollers 56 supported by pin 55 are located on the outside of its associated guide, the tips of the hooks will swing upwardly when their toe portions encounter these structural parts during down travel of the elevator system. This moves the hooks to a lower lift position for a new sequence. The bottom of each hook structure is also sloped between its toe and heel so that it will not hang up on the scaffolding structure during this downward travel. The outer surface of rollers 56 may have a hard rubber surface to cushion the shocks as they cycle about pin 49 during their own travel and slam against surfaces 57.

In FIG. 4 the assembly or dismantling operation of a stack or column of commercial scaffolding units is shown illustrating how a new scaffolding unit can be added or subtracted from the bottom of the stack or column. Hooks 45, one on each guide 38, support the base scaffolding unit 60 through their engagement with the upper internal cross bar 61 adjacent to the corner posts of its end frames. As can be seen in FIG. 4, the base unit is supported near the top of the machine frame. This base unit may have a number of additional scaffolding units stacked on its top which are not shown. With the base unit supported at this position in the machine, telescoping dowel pins 62 are inserted in the tops of the tubular corner post 63 of a new scaffolding unit end frame 64 and this end frame is manually inserted into the machine by telescoping the projecting portions of dowel pins into the bottom ends of the tubular corner posts 65 of the base unit, after which the bottom of this end frame is swung toward the machine (indicated by arrows A) so that the bottom ends of its corner posts are received in spaced apart channel foot supports 66 secured on the lower cross beam 43 of each side frame of the machine.

When the bottom ends of the end frame are received into the channel foot supports, its corner posts will abut against stops 67 so it will be aligned with the end frame of the base unit directly above it. The dowel pins will loosely connect the tops of the new end frame with the bottoms of the end frame of the base unit. So positioned, the newly inserted end frame will be secured in the machine and the operator may devote his full attention to applying the diagonal X-bracing member means between the end frame and an end frame inserted in the like manner on the opposite side of the machine. With the attachment of the X-bracing member, a complete new scaffolding unit is built beneath the base unit; alternatively, a unit may be disassembled and removed from the bottom of the stack in a reverse operation.

Assuming a new scaffolding unit has been assembled under the base unit as described above, it is partially telescoped with the base unit above it through dowel pins 62 and the elevator system controlling the lifting hooks 45 can be lowered so that the base unit will seat on the newly assembled scaffolding unit. At this point, the entire stack will be supported on the four channel foot support members 66. As the elevator system carries the lifting hooks downwardly they will flip about their pivot pins 49 so that their toes 51 will clear the structural parts of the assembled scaffolding units as the lifting hooks contact these structural parts during their down travel. When the lifting hooks are beneath the internal cross bar of the newly assembled unit, the elevator system can be reversed and the lifting hooks will engage the newly assembled unit, which then becomes the base unit, and will elevate it to the level of the previous base unit. The whole stack of scaffolding units is then elevated, allowing another unit to be inserted in the manner just described. Because of the aperture 52 in the hooks, the base unit is restrained against any lateral movement, stabilizing the stack. The attachment of the channel foot supports 66 to the machine is shown in FIG. 5, illustrating their pivoted attachments to the bottom cross beam 43 on each side frame of the machine. Lugs 68 on each side of each foot support receive a pin 69 which passes through the central portion of the lugs and apertures in the foot support, pivotally supporting them on their associated beams so that the projecting end may be lifted upwardly, swinging the ends of the supports to the outboard side of the machine. This pivoted arrangement will allow the operator to clear the area immediately below the base unit in the column or stack so that screw jacks can be inserted into the corner posts of the lower unit and the stack can be lowered to the ground so that the machine can release the column or stack. The screw jacks are adjusted before the stack is lowered so that the column or stack will be level when it contacts the ground. This is easily accomplished since the stack in the machine is plumb because the frame is automatically leveled as described in greater detail hereinafter. Thus, the jack units can be appropriately set prior to lowering the stack.

As indicated, the machine is self-leveling and employs hydraulic jacks 30 in each wheel support frame 20 to adjust the height of its associated wheel 22. Circuits, both hydraulic and electrical are shown in FIG. 6, for leveling the machine. Electrical circuit 70 is employed to control electrohydraulic valves 71, 72, 73 and 74 and is powered by current from battery 75 when switch 76 is closed. The circuit also includes an emergency off switch 76 by which the operator can cut the power to this circuit in an emergency situation. Applying battery power to one or the other of the two control leads of each of the electrohydraulic valves will cause it to send pressurized fluid from pump 78 and hydraulic manifold 79 through either line 80 or 81 connecting it to its associated hydraulic jack 30 to extend or retract its wheel post 24. Lines 80 and 81 normally include a parallel ball check valve 82 and a restrictor or orifice 83 arrangement (indicated schematically by broken lines) which prevents the associated jack from reacting too rapidly when the valve is actuated and provides damping in the level control system to eliminate oscillation. Relief valves 84 maintains the pressure of the fluid in the manifold constant, which is registered by a gauge 85 communicating with the manifold.

Automatic actuation of the electrohydraulic valves 71, 72, 73 and 74 is accomplished by the level control circuit. Normally, valve 71 is controlled by a manual switch 86 which is employed to set the height of the reference corner or leg of the machine. Thereafter, the remaining three corners or legs of the machine will automatically level relative to this reference corner or leg of the machine. Thus, in the automatic position of switch 87, three mercury level switches 88 connected on the frame of the machine adjacent to their associated corner or leg will provide a control signal to the electrohydraulic valve which controls the jack associated with its corner or leg.

These mercury level switches will provide a battery output on one or the other of their two signal leads of their associated electrohydraulic valve, depending upon their direction of tilt, which in turn will actuate its jack 30 to level the machine. As the machine levels, the mercury pool will center in the curved bulb of the mercury switch leaving both its output leads without a signal. In the schematic shown in FIG. 6, leads a of the circuit are connected with leads a of valve 72 while leads b connect with leads b of valve 73 and leads c connect with leads c of valve 74. Through this arrangement, the mercury level switches when they are properly attached to the frame portions of the machine acts to bring all corners or legs level relative to the reference leg. Manual switches 89 and 90 are also provided in the level control circuit which can be depressed to raise or lower all four corners or legs of the machine simultaneously; alternatively, any set of contacts 89a and 90a can be independently operated so that an adjustment of each individual leg can be accomplished manually.

Pump 78 shown in FIG. 6 is driven by a vehicle mounted engine 100 (shown in FIG. 1) and provides pressurized hydraulic fluid to manifold 79. This manifold is connected through a one-way check valve 101 and a directional control valve 102 that controls fluid flow to conduits 103 which connect with a hydraulic motor 104. This hydraulic motor contains internal reduction gearing with a pressure actuated brake and is a commercially available unit sold by Gearmatics Co., Ltd., of British Columbia, Canada. The hydraulic motor is reversible, with its direction of rotating being controlled by the position of the valve 102. Its output shaft 105 is connected through coupling 106 to the input of gear transmission 107. The output gear 108 of the transmission is connected with a roller chain 109 to the angle drive box 35 at one front corner of the machine through which all the elevator chains 31 of the elevator system are simultaneously powered. As previously mentioned, the mechanical inner connections of lay shafts 33 through the angled drive boxes and the cross shaft, plus the construction of the hooks 45 and guides 38 will maintain all the lifting hooks 45 synchronized or timed relative to one another. Thus, when the elevator system is raised or lowered through driving the transmission, a scaffolding unit supported in the elevator system will rise or lower in a stable, plumb condition. Application of the internal brake in the hydraulic motor 105 will simultaneously lock all elevator chains in their position or location at the time the motor stops.

Electrical circuit 110 provides control of the hydraulic motor through actuation of solenoid 111 which is connected to position the directional valve 102. This electrical circuit includes an "up" circuit and a "down" circuit which are employed to control latching relays 112. A manual override "up" switch 113 is included in the circuit and so is the manual override "down" switch 114 by which the elevator chains and lifting hooks can be moved to any intermediate vertical position on their respective guides 38. Normally, the elevator system will be automatically operated through the "up" and "down" portions of the circuit so that the elevator system will be moved a predetermined interval up or down. Lifting hooks 45 cannot be taken above the tops of guides 38 since this will trip a safety limit switch 113a in the "up" power lead to solenoid 111 preventing any further up travel of the elevator system which prevents inadvertent release of the scaffolding units held in the machine.

For example, assuming a new scaffolding unit has been assembled under an elevated base unit previously described, at this time the operator will depress the momentary down switch 115 after directional switch 116 is placed in the up mode so that the appropriate micro- or limit-switch located on one of the guides will be selected. This will cause latching relay 112 to close contacts 117 and keep them closed until the latching relay is again pulsed. The elevator system thus starts down lowering the base unit onto the newly assembled scaffolding unit and continues down until lifting hooks 45 are below the selected lift points on the newly assembled scaffolding unit, which is then supporting the stack of units. The down travel of the hooks is limited by microswitch 118 which is tripped by the lug 45a (see FIG. 3) on the face of one of the lifting hooks and pulses the latching relay causing contacts 117 to open, stopping the elevator system.

At this point, the operator presses the momentary up switch 119 and the elevator system starts upwardly lifting the stack to the position of the previous base unit, the elevator system being stopped in this position when microswitch 121 is tripped to open contacts 120 which were previously closed by the latching relay when switch 119 was momentarily depressed.

When an assembled stack of scaffolding units is to be disassembled or dismantled, the directional switch 116 is placed in the down mode and the machine is properly oriented at the base of the stack with its four channel supports 66 swung outwardly so as not to interfere with the bottom screw jacks of the stack which support it on the ground. After leveling the frame the momentary down switch 115 is depressed and the down travel of the elevator chains is initiated and continued until the lifting hooks 45 travel up the back sides of guides 38 and over gears 32 so that they will come under the lift points of the second scaffolding unit in the stack where microswitch 122 is tripped and pulses the latching relay stopping the elevator chains by opening contacts 117. It should be appreciated that additional hooks can be attached to elevator chains to eliminate the necessity of running the hooks completely through nearly a full loop. With the lifting hooks directly under the lifting points of the second scaffolding unit in the stack, the momentary up switch 119 is depressed and the elevator system reverses so that the lifting hooks will lift the second unit upwardly a few inches off the top of the base unit of the stack at which time microswitch 123 will trip and pulse the latching relay to open contacts 120. Since the stack is then completely supported by hooks 45, the bottom unit can be disassembled and removed from the machine and the four channel foot supports 66 then are flipped inboard so that the corner port of the machine supported scaffolding unit will be received in these foot supports as the stack is subsequently lowered. Since the machine has been previously leveled, the stack will be supported in a level or plumb condition on the channel foot supports when the elevator system lowers its stack onto these supports. The foregoing cycle is then repeated as each subsequent scaffolding unit is removed, one by one, from the bottom of the stack.

Hydraulic motors 26 which power the front wheels of the machine are controlled by directional valve 130 operated by a foot pedal 131 through linkages 132. A flow control valve 133 controlled by speed lever 134 adjusts the speed of the motors and is normally placed in the stop or "S" position. At this point, the foot pedal is pressed for either a forward or reverse direction and the speed lever is advanced from the stop position toward the fast or "F" position until the desired machine speed is achieved.

Also shown in FIG. 6 is a simplified control steering circuit employing four hydraulic control valves 140, 141, 142 and 143 each of which is connected to a separate hydraulic cylinder 140a, 141a, 142a, and 143a, respectively. One cylinder is employed with each one of the four wheels of the vehicle which are swivelly mounted at the bottom of their associated support post 24 so actuation of the cylinder will steer it. Normally, the control levers for these four valves will be "banked" in a group so that they can be pushed simultaneously or in pairs in order to make steering control more convenient. The connection of the hydraulic cylinder to the individual wheels of the machine is best illustrated in FIG. 10 and it should be appreciated that since a machine of this type is often required to work in highly confined quarters, it is necessary to have the full steerability on all four wheels.

In FIG. 7 an alternate steering system is shown wherein the manual hydraulic valves 140, 141, 142 and 143 have been replaced with electrohydraulic control valves 150, 151, 152 and 153 which are connected to a separate source of pressurized hydraulic fluid in manifold 154 supplied by pump 155 which is also driven by the vehicle engine 100. Relief valve 156 maintains the selected pressure in this manifold which is registered on gauge 157. A drain manifold 158 returns the hydraulic fluid to reservoir 159 which is common to both hydraulic systems.

Each electrohydraulic valve is connected to its associated steering cylinder by a pair of conduits 160, each of which includes a parallel orifice 161 and a ball check valve 162 so the flow through the conduit is controlled by the orifice only in one direction. The ball check valves are arranged to restrict the flow of hydraulic fluid returning to its reservoir through the parallel orifice, and these orifices are preferably adjustable so that the steering movements of all four wheels of the vehicle can be matched to a uniform rate. Since these electrohydraulic valves are either the "on" or "off" type and the four wheels are not connected together with tie rods, the controllable orifices are used to achieve uniform steering rates.

The control circuits 163 for steering with the electrohydraulic valves are shown in FIG. 8 wherein leads $h$ of the control circuits connect to leads $h$ of solenoid 164 FIG. 7); leads $i$ of the circuits connect to leads $i$ of solenoid 165; leads $j$ of the circuits connect to lead $j$ of solenoid 166 and leads $k$ of the circuits connect to leads $k$ of solenoid 167.

When so connected, a plurality of individual switches 168 in these circuits provide independent actuation of any one to four wheel steering cylinders in either direction by connecting a positive battery voltage to one or the other actuating coil of their associated solenoids to operate its valve. These switches are spring loaded to the open position and are depressed for period sufficient to cause a wheel to slue to desired position within its steering range. Steering of the machine is generally accomplished with ganged switches 170, 171, 172 and 173 which will cause the four wheels to simultaneously steer to the positions 1, 2, 3 and 4 (illustrated in FIG. 9) or any intermediate positions when these ganged switches are depressed separately. With the wheels turned to the positions indicated in FIG. 9, the machine will be moved generally in the directions indicated by the arrows within the several positions figures. Further, it should be appreciated that a ganged switch utilized for obtaining the opposite steering position of the wheels can also be utilized to center or align all four wheels of the machine simultaneously with the fore and aft axis of the machine by depressing it only for a period sufficiently long enough for the wheels to turn to the desired positions.

The connection of the individual steering cylinders 140a, 141a, 142a and 143a with their associated wheel 22 is best illustrated in FIGS. 2 and 10. In these figures it can be seen that the wheel posts 24 extending from each wheel frame 20 includes a base plate 175 on its projecting base. The wheel fork 23 of each wheel is pivoted with pin 175a in its associated base plate and the hydraulic steering cylinder associated with each wheel post is connected between a lug 176 on the fork and a lug 177 on the base plate so that the wheel can be turned approximately 45° on either side of a fore-and-aft position by actuation of its cylinder since the wheel post is restricted from turning.

In FIGS. 10 and 11 an alternate construction of the machine frame is illustrated wherein the intermediate cross beam 43 is employed as the principal lateral support member for each side frame. Other than this frame fabrication change the machine is essentially the same in operation as previously described.

Also shown in FIG. 7 is a positive locking brake arrangement 190 which includes spring loaded actuators 191 that apply spring pressure on friction elements 192. These elements are applied directly on the thread of the tires of wheels which are to be braked, or alternatively are applied against brake drum associated with these wheels for locking them against rotation. A control valve 193 actuated by lever 194 normally vents the hydraulic chambers of the actuators to reservoir 159 allowing their spring to apply pressure on the friction elements. To release the brakes the lever is moved to route pressurized hydraulic fluid from manifold 154 to the hydraulic chambers of the actuators thereby overcoming the spring pressures and releasing the frictional engagement of the frictional elements. Through this arrangement, positive braking is available although hydraulic pressure is lost and an effective emergency brake is provided for the machine since hydraulic pressure is necessary to release the brakes.

In FIG. 11 the scaffolding erecting machine 10 is shown with four stabilizing winches 200 mounted on four frame extensions 201 on each of top corner of the machine. These four winches maintain a constant tension, the tension being equal on all four winches, on their associated cables 202 which connect to the top of the stack of the column of scaffolding units with hooks 203, as illustrated. The winch control system is designed to provide a constant cable tension on the stack as it is elevated or lowered by the machines elevator system and will stabilize the top of the stacks of columns so that it rises or descends in a stable, plumb condition in windy conditions.

The individual winch unit 200 includes a commercially available winch 204 which is driven by a hydraulic reversible motor 205, as shown schematically in FIG. 12. Generally, a two-ton capacity winch is suitable and is normally powered by a hydraulic motor similar to that employed to drive the elevator's system. The hydraulic circuit 210 for the four hydraulic winch motors 205 is shown in FIG. 7. Each motor is connected to an electrohydraulic valve 211 with a conduit 212 and a conduit 213, the latter of which includes a parallel adjustable orifice 214 and a ball check 215 which limits the flow of pressurized fluid to the motor through the variable orifice when it is winding its associated cable on its winch. Conduits 212 and 213 are cross connected with relief valves 216 and 217 arranged for opposite cross flow so that when pressures are developed in the motor which exceed their relief pressures of these valves, this pressure will be vented to the opposite conduit and to reservoir.

Assuming all the electrohydraulic valves are shifted so that the pressurized fluid for manifold 154 passing through flow control valve 217, conduit 218 and is passing through the variable orifices 214 which connects each motor to the source of pressurized fluid, each of the motors will be driving their associated winch to wind their cable on their winch. By properly adjusting flow control valve 217 and the variable orifices, a constant and equal tension will be applied to all four cables. If, under these conditions the elevator system is raised lifting the stack, each of the four motors will be reversed in direction and the pressures therein uniformly increased until cross flow through one of the relief valves occurs at which time the elevator system will raise the stack in a plumb condition under constant tension.

The control circiuts 219 for electrohydraulic valve 211 for the winch motors 205 are shown in FIG. 13 wherein the individual switches 220 can be manually depressed, with switch 221 in its manual position, for independent operation of its associated electrohydraulic valve and to wind its cable 202 on its associated winch. By depressing independent switches 222 in this circuit, the hydraulic motors will be driven in the opposite direction which will cause the cables 202 to pay out from their associated winches so that hooks 203 can be attached to the stack or released therefrom when the stack has been built to the desired height. When the winch system is employed during the erection of a stack of scaffolding units, the hooks are attached as shown in FIG. 11 to the top of the stack as it egresses from the top of the frame of the machine. After cable slack has been taken up, switch 221 is placed in the auto position so that all switches 220 are bypassed and the hydraulic motors 205 driving the four winches are all connected to manifold 218 through their associated control orifices to maintain a constant and equal tension on all four cables as the stack is elevated through the elevator system by adding individual units to the bottom of the stack.

The pairs of leads *l*, *m*, *n*, and *o* shown in FIG. 13 are respectively connected to leads *l* of solenoid 225, leads *m* of solenoid 226, leads *n* of solenoid 227 and leads *o* of solenoid 228 shown in FIG. 7 in order that the control circuits will function as described above.

Utilizing the four stabilizing winches 200 enables the machine to erect a much higher stack of scaffolding units and would otherwise be possible since the top of the stack is sufficiently stabilized to prevent oscillation. Further, wind loadings on the top of the stack which would otherwise limit its height are not of consequence when this top is stabilized with the winch system. In addition, since the machine has four wheel steerability and automatic leveling, a stack of commercial shoring units can be actually moved as an assembled stack from one location to another with the winch cables attached to the top of the stack.

One of the very important features of the machine equipped with the winch system is the ability to place a considerable amount of the parts necessary to interconnect the tops of the erected stacks on the top of each stack as it egresses from the top of the machine. Normally the screw jacks, junior beams and a number of other parts are assembled on the top of the first assembled unit for each stack as it comes out of the machine and then elevated with this unit. Without the stabilization provided by the winch system such a top heavy stack would be unstable. However, through the winch stabilization economies in both time and money are realized with the winch equipped machine by carrying these parts to the top of the stacks at the same time they are erected.

Under actual conditions when scaffolding stacks are being erected to height above 18 feet, the machine can erect the stacks from two to four times faster with half the manpower than can be accomplished manually. Further, there is less physical drain on the personnel assembling the scaffolding substantially lessened, providing greater efficiency and safety.

I claim:

1. An automatic scaffolding erecting and dismantling machine comprising:
   a box-like frame composed of two L-shaped frames telescoped together to form said frame with one open side, an open top and an open bottom;
   a plurality of wheels mounted on said frame supporting it above the ground at least two of which are dirigible wheels;
   a plurality of vertically adjustable means connected to said frame and operable to adjust the height of said frame relative to the ground;
   a vertical elevator means having at least a pair of inwardly directed spaced-apart lifting hooks mounted on opposite sides of said frame, said lifting hooks mechanically timed with one another;
   drive means connected to drive said elevator means; and
   control means associated with said dirigible wheels, said vertically adjustable means, said vertical elevator means and said drive means whereby said machine can be employed to erect and dismantle stacks of commercial scaffolding units.

2. An automatic scaffolding erecting and dismantling machine as defined in claim 1 wherein the two L-shaped frames include locking means whereby they can be adjusted where said frames are telescoped together to change the width of said machine for different size scaffolding units.

3. An automatic scaffolding erecting and dismantling machine as defined in claim 1 wherein the frame is supported by four dirigible wheels one located adjacent to each corner of said frame and includes an actuating means attached between said frame and said dirigible wheels to steer said frame.

4. An automatic scaffolding erecting and dismantling machine as defined in claim 3 wherein an actuating means is included for each of the four dirigible wheels whereby said wheels can be steered independently.

5. An automatic scaffolding erecting and dismantling machine as defined in claim 4 wherein said actuating means are hydraulic cylinders which include adjustable flow control means for uniform steering rates among the several dirigible wheels and a source of pressurized hydraulic fluid is provided on said machine.

6. An automatic scaffolding erecting and dismantling machine as defined in claim 5 wherein steering control circuits are included in said control means whereby the four dirigible wheels can be steered simultaneously, in pairs and independently through push buttons in said steering control circuits.

7. An automatic scaffolding erecting and dismantling machine as defined in claim 1 wherein the plurality of vertical adjustable means includes at least four actuators located adjacent to the corners of said frame which are operable between said frame and the ground to level said frame by adjusting its height above the ground.

8. An automatic scaffolding erecting and dismantling machine as defined in claim 7 wherein the four actuators are connected between said frame and the mounting of the plurality of wheels whereby the leveling of said frame can be achieved by changing the relative relationship of said wheels to said frame.

9. An automatic scaffolding erecting and dismantling machine as defined in claim 7 wherein level sensing circuit means are provided in the control means which are operably connected to control at least three of said four actuators to level said frame automatically.

10. An automatic scaffolding erecting and dismantling machine as defined in claim 1 wherein the inwardly directed spaced-apart lifting hooks on opposite sides of said frame each include an associated vertical guide means and each hook includes a positioning aperture whereby lateral stability is achieved of a scaffolding unit supported by said lifting hooks.

11. An automatic scaffolding erecting and dismantling machine as defined in claim 10 wherein the lifting hooks are connected to roller chains each driven by a sprocket keyed to a common interconnected mechanical shaft system.

12. An automatic scaffolding erecting and dismantling machine as defined in claim 11 wherein the drive means is a reversible hydraulic motor operated from a source of pressurized fluid on the machine and elevator circuits in the control means include switching means associated with at least one of the lifting hooks and associated guide means whereby said lifting hooks will automatically move up and down a predetermined interval when activated in either direction.

13. An automatic scaffolding erecting and dismantling machine as defined in claim 1 wherein a winch system is included on the frame with winch means located adjacent to the top corners of said frame and operable to maintain equal and constant tension on cables connecting each of said winch means to the top of the stack of scaffolding units supported within said machine.

14. An automatic scaffolding erecting and dismantling machine as defined in claim 12 wherein the bottom of the frame includes retractable foot support located under the elevator system to support the end frames of scaffolding units and a stack of scaffolding units when lowered thereon by said elevator system.

15. An automatic scaffolding erecting and dismantling machine as defined in claim 14 wherein the distance between the elevated position of said elevator system and its associated retractable foot supports is such that an end frame partially telescoped with the machine supported unit will be retained on said retractable foot supports and its connection with said machine supported frame when inserted.

16. An automatic scaffolding erecting and dismantling machine as defined in claim 1 wherein wheel drive means are connected to two of the wheels of said machine to power the machine across the ground.

References Cited
UNITED STATES PATENTS

| | | | |
|---|---|---|---|
| 1,360,131 | 11/1920 | Miller | 52—123 |
| 1,531,982 | 3/1925 | Sago | 182—41 |
| 2,794,558 | 6/1957 | Miles | 214—1 |
| 2,857,994 | 10/1958 | Sheard | 182—178 |
| 3,150,740 | 9/1964 | Rubeli | 182—178 |

REINALDO P. MACHADO, Primary Examiner

U.S. Cl. X.R.

182—141, 178; 214—1, 6